Patented Jan. 3, 1928.

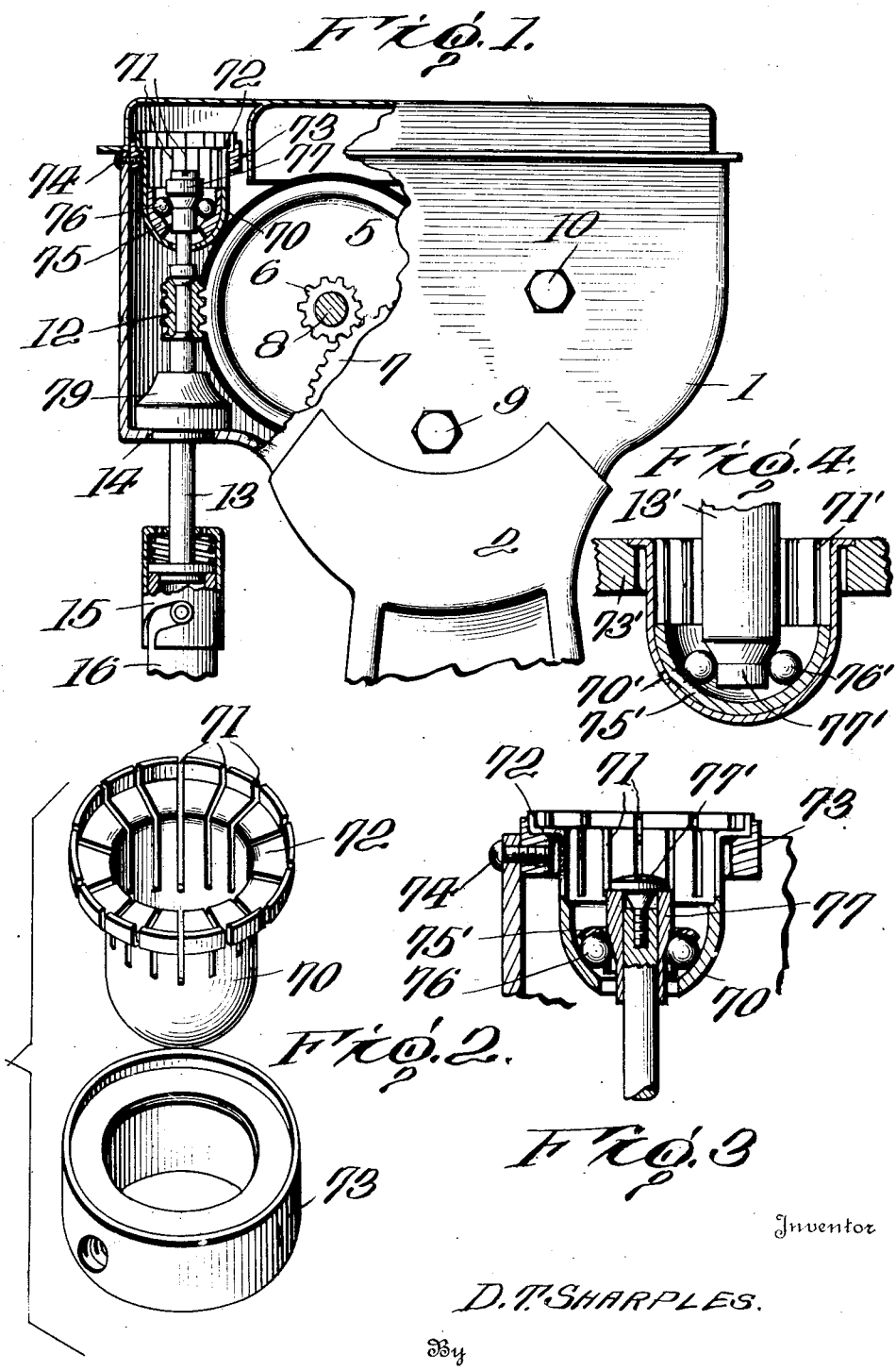

1,655,074

UNITED STATES PATENT OFFICE.

DAVID T. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

AUTOMATICALLY CENTERING BEARING FOR ROTARY SHAFTS.

Application filed July 3, 1923. Serial No. 649,239.

This invention relates to shaft bearings, and more particularly to a centering bearing for a depending rotary shaft.

The present invention embraces subject-matter withdrawn from a pending application Serial No. 579,200, filed jointly by me and P. M. Sharples, August 2, 1922, and the claims herein are restricted to those features of the invention relating solely to a bearing for supporting a revolving spindle.

The object of the present invention is to provide a simple and efficient bearing which will automatically center itself.

Another feature of the invention resides in providing a simple form of bearing which is capable of both lateral and vertical elasticity.

Still another object of the invention resides in constructing the device so that if the spindle sways sidewise or the bearing itself moves laterally, or becomes out of alinement, the plane passing through the center of the balls supporting the upper end of the spindle will remain at right angles to the axis of the revolving spindle, the balls will revolve in a circle in proper position relative to the revolving spindle, and the bearing will constantly tend to return to its normal central position.

These and other objects will be apparent from the following specification and accompanying drawing, wherein—

Figure 1 is a side view of the gear casing partly broken away to show the bearing in position;

Fig. 2 is a detailed perspective view of the bearing cage and its supporting ring;

Fig. 3 is a slightly different construction of ball race, and

Fig. 4 shows a modification of the invention as applied to a bottom shaft support.

Referring now in detail to the drawing, the gear case 1 which is supported on a standard 2 provides a bearing for the usual gearing for driving the bowl spindle, three of which gears shown as at 5, 6 and 7, can be mounted on suitable spindles 8 and 9, passing from one side of the case to the other. The large gear 5 meshes with the usual worm 12 rigid with the vertically depending bowl spindle 13 which is mounted in the bearing carried in the upper part of the casing. The hanging spindle 13 passes freely through an opening 14 in the bottom portion of the gear casing 1, which construction permits the free and unrestricted rotation of this spindle. The bottom of the bowl spindle is provided with the usual type of bayonet connection 15 with the upper portion 16 of the rotating bowl, not shown.

When the invention is applied to a revolving spindle of the hanging bowl type, the spindle 13 is mounted for rotating in a bearing which comprises a metal support or cage 70, preferably in the form of a cup having an opening in its bottom and a substantially spherical lower inner bearing surface. The upper rim or periphery of this support or cup is flanged as at 72 so as to provide a shoulder seating on a corresponding shoulder of a stationary ring 73 held by suitable fastening screws to the basin 1. This mounting permits the cup to hang freely from the ring. The upper peripheral wall of the cup or support is provided with a plurality of slits 71 in its sides which preferably extend part way down to the spherical surface. These slits can be made in any desired manner. In the form shown, they extend entirely to the edge of the flange 72, but need not necessarily. The slots being located between the point of hanging support of the cage and the lower spherical surface provide a resilient, flexible mounting for the cage which permits it to give in all directions. The bottom of this support or cage 70 receives a spherical retainer or spacer 75 for supporting the balls 76 which support the conical shoulder 77 of the shaft or spindle 13. This conical shoulder 77 is preferably formed as a separate sleeve held in place by means of a headed screw. By means of this construction it is evident that the bowl and revolving parts are supported by a metal spring support or cage which gives elasticity or resiliency in all directions, either horizontally or vertically, and at all times tends to return the bearing to its normal central position. This bearing in addition, is so constructed that when the bowl sways sidewise, or the bearing itself moves laterally, or in case of faulty construction, when the alinement is not accurate, the balls supporting the upper end of the spindle will nevertheless revolve in a circle and in proper position as regards the revolving bowl spindle. This is due to the novel construction wherein the plane passing through the center of the balls will always remain at right angles to the axis of the revolving bowl spindle when the axis sways to one side or the other. Manifestly, this results from the fact that the inner lower surface of the cage or support 70 is approximately spherical or rather a section of a sphere.

In Fig. 3, the ball race 75' is shown slightly different in construction so that the balls make rolling contact not only with the conical walls of sleeve 77, but also with the inner spherical walls of the cage 70.

In Fig. 4, the invention is illustrated as applied to a bottom support for shaft 13'. In this variation, from the frame 73' hangs the closed bottomed cage 70' which is formed as heretofore described with the upper slitted portion 71' to provide the lateral and vertical resiliency. The bottom of the cage is closed and is provided with a cup or bearing 75', the inner surface of which is substantially spherical. This cup supports the balls 76' which carry the lower conical end 77' of shaft 13'.

It is obvious that minor changes in the details of construction and the arrangement of the parts may be made without departing from the spirit of the invention as set forth in the appended claims.

Having thus described the invention, what I claim as new and desire to secure by Letters Patent, is—

1. An automatically centering bearing comprising a frame, a support hanging at its upper end from said frame and formed with an opening at its bottom, the upper walls of said support below its point of engagement with said frame being flexibly constructed to permit said support to give both vertically and horizontally, said support having the inner face formed substantially as a zone of a sphere adjacent the opening at the bottom thereof, balls mounted on the spherical surface, a vertical shaft passing through said opening to a point above the balls on said spherical surface, and a bearing head on the upper end of said shaft adapted to rest on said balls and form the sole support for said shaft, said spherical surface being of sufficient extent so as to permit the balls resting thereon to move upwardly on one side of the shaft and downwardly at the other side of the shaft, so that said shaft may be moved out of the normal axis of revolution.

2. An automatically centering bearing comprising a frame, an open-bottomed cage hanging from said frame, a shaft passing through the opening and mounted for rotation in said cage, the walls of said cage below its point of bearing being slitted peripherally to permit said cage to give both vertically and horizontally.

3. In a hanging shaft supporting bearing, a frame, an open-bottomed cup-shaped cage supported by said frame and having its periphery formed intermediate its top and bottom with a plurality of slits, balls supported in said cage, and a bowl spindle passing through the bottom of said cage and having a conical portion resting on said balls.

4. In a shaft supporting bearing, a frame, a spindle, a support resiliently supported on said frame and having a substantially inner spherical surface, balls carried by said surface for supporting said spindle, said support being constructed and arranged so that the plane passing through the center of said balls will remain at right angles to the axis of the spindle when said axis sways to one side or another.

In testimony whereof, I affix my signature.

DAVID T. SHARPLES.